No. 855,723. PATENTED JUNE 4, 1907.
J. F. McELROY.
ELECTRIC REGULATING DEVICE.
APPLICATION FILED JULY 10, 1905.
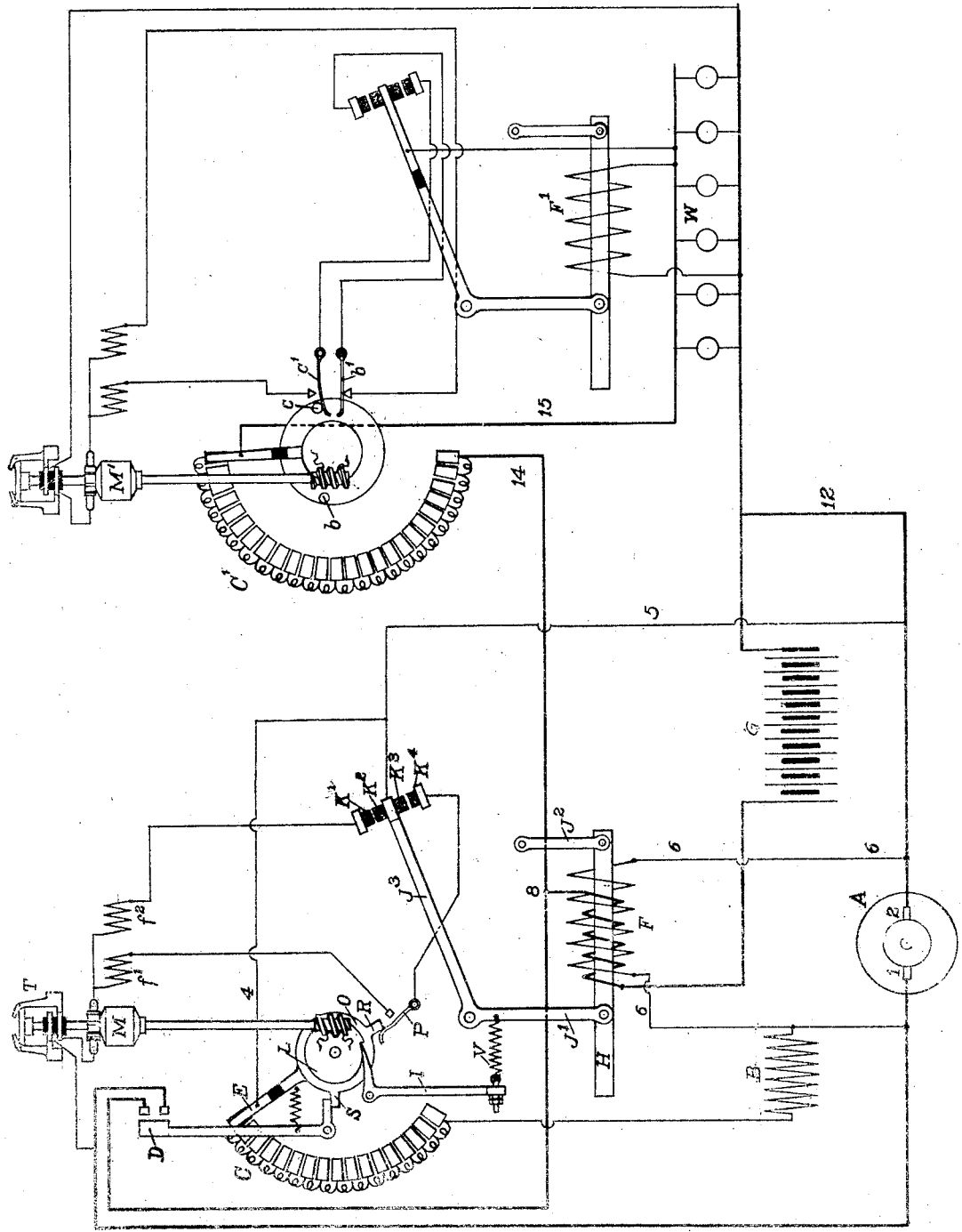
Witnesses
L. T. Shaw
J. R. Kline
Inventor
James F. McElroy
by
Bentley & Pierson
Attys.

UNITED STATES PATENT OFFICE.

JAMES F. McELROY, OF ALBANY, NEW YORK, ASSIGNOR TO CONSOLIDATED CAR HEATING COMPANY, OF ALBANY, NEW YORK, A CORPORATION OF WEST VIRGINIA.

ELECTRIC REGULATING DEVICE.

No. 855,723.　　　Specification of Letters Patent.　　　Patented June 4, 1907.

Application filed July 10, 1905. Serial No. 268,925.

*To all whom it may concern:*

Be it known that I, JAMES F. MCELROY, a citizen of the United States, residing at Albany, in the county of Albany and State of New York, have invented certain new and useful Improvements in Electric Regulating Devices, of which the following specification and accompanying drawing illustrate the invention in a form which I now regard as the best out of the various forms in which it may be embodied.

The accompanying drawing illustrates my invention in diagram.

In operation of dynamos, particularly those running at a variable speed, as when driven by the axle of a railway vehicle, it is desirable to adjust the output of the machine, particularly in such a way as to maintain a constant voltage on the supplied system. To this end, in apparatus heretofore devised and patented by me, I have employed a magnet responding to that factor of the current energy which it is desired to maintain constant and acting, upon any departure from the constant value desired, to set into operation an electric motor which, in turn, serves to move the contact arm of a rheostat included in the field magnet circuit of the dynamo. Thus, assuming that the magnet aforesaid is a shunt magnet measuring the potential or voltage of the dynamo, and that upon either side of a certain critical voltage it acts to close the circuit of a motor in one direction or the other, it will serve, through the agency of the said motor, to maintain the voltage of the dynamo at the aforesaid critical point, since any tendency of the voltage to increase will be neutralized by an increased amount of resistance in the field magnet circuit of the motor and any tendency to decrease will be in a similar manner neutralized by a decreased amount of resistance in the said field magnet circuit, the field magnet becoming weaker or stronger in inverse ratio to the dynamo speed.

In the arrangement just described I have heretofore employed a motor of a voltage corresponding in the usual way to the voltage of the operating circuit. It will be observed however that the motor is in series with its controlling contacts operated by the magnet and also that it is important that, while the voltage is being restored to its normal value by the regulating action, the motor should continue to operate the resistance until the normal voltage is fully restored, when the magnet armature will come back to its normal position and so break the motor circuits at the contacts. I have found, however, that this action is a gradual one and that the magnet tends to reduce gradually the pressure between the contacts and even separate them before the normal conditions have been fully restored. This tends to form an arc at the contacts which I have discovered may so reduce the voltage applied to the motor that it will cease to act before normal conditions are restored and that in such a case the arc may persist and injure the contacts so that the efficiency of the contacts is seriously impaired. It also affects the voltage on the lamps. I have also found that the load on the motor is a variable one, the apparatus when freshly oiled running more easily than at other times which serves to increase the arcing tendency just mentioned.

While in apparatus of this kind the normal voltage of the motor which ordinary practice would dictate is not inoperative and has been heretofore used in my lighting system, yet this trouble is sufficiently serious to call for a remedy that will insure a more constant and certain voltage on the lamps and avoid the injury to the contacts.

The difficulty above mentioned I have overcome by so constructing the motor that the current therein will give the maximum torque required by the rheostat at a voltage very materially less than the normal voltage on the system. For example, if the normal voltage is 70 I so construct the motor that it will operate at 30 volts, which will give an allowance of 40 volts for the arc and such resistance as may be present in the contacts when they are separated gradually by the gradual return of the voltage to its normal value. In other words my so-called 30-volt motor is one wound with such resistance that when connected to a 70-volt circuit and blocked against rotation, its maximum torque (ampere-turns) will be the same as that due to a line pressure of 30-volts on the 70-volt motor unblocked and free to generate its counter electromotor force. This gives my new 30-volt motor an even higher resistance than my old 70-volt motor. Of course the contacts are still separated gradually as the voltage gradually returns to its normal point; but the effect of such gradual separation upon the movement of the motor has been eliminated. The motor travel becomes sharply defined, though the contact movements are not. The motor will not make its full run, corresponding to the degree of the tendency to departure from normal line voltage occasioned by variation in train speed or demand for current, and the motor speed (under the limitation of the centrifugal circuit-breaker) will be the same, whether the apparatus has been freshly oiled or whether the bearings have been coated with the fine dust inseparable from railway service. There no longer exists the correspondence between the diminishing contact pressure as the regulator magnet comes back to its normal or satisfied condition and the diminishing power of the motor as it restores the said normal or satisfied condition, because the motor and magnet no longer have the same determinating voltage; the former having 30 and the latter 70 volts. By this means the motor will continue to act in spite of such resistance or arc as may be present at the contacts and will cause the contacts to separate positively by completely restoring the voltage to its normal value. The natural tendency of the apparatus to come to a stop by establishing a condition of equilibrium at some point on one side of the normal point is overcome and a definite clear-cut action of the regulator is insured. It serves moreover to increase the accuracy of the controlling magnet.

Turning to the accompanying diagram, A represents an armature of a variable speed dynamo, for example, a dynamo driven by the axle of a railway vehicle.

B is the field magnet of the dynamo and C is a rheostat in series therewith. The field magnet is in a shunt circuit starting from the commutator brush 1 and passing through the field magnet coil B and the rheostat C to the rheostat contact E and thence by the wires 4 and 5 to the opposite commutator brush 2.

F is the regulator magnet having a shunt coil contained in the circuit 6 extending from the positive to the negative brush of the dynamo. The magnet also contains a few turns of wire in the branch circuit leading to the battery G whereby the action of the coil is slightly modified according to the condition of the battery and the amount of current flowing thereto.

H is the core of the magnet which is of the solenoid type and the core is suspended horizontally by parallel links $J^1$ $J^2$. The link $J^1$ forms one arm of an angle lever of which the opposite arm $J^3$ carries the contacts $K^2$ and $K^3$, the former coöperating with contact $K^1$ to close the circuit of the motor M through the field magnet $f^2$ and the latter coöperating with the contact $K^4$ to close the motor circuit through the field magnet $f^1$. The two field magnet coils are oppositely wound and serve respectively to give opposite directions of rotation to the motor. By this means, according to the greater or less strength of current in the shunt coil of the magnet F (which in turn depends upon the dynamo voltage) the motor circuit is closed at $K^1$ $K^2$ or at $K^3$ $K^4$ to cause the rotation of the motor in one direction or the other. When the voltage is at its normal value the magnet holds the contacts $K^2$ and $K^3$ out of engagement with either $K^1$ or $K^4$, and it is only by reason of a departure from the normal voltage that the magnet closes one or the other of the two motor circuits. The motor circuit goes from the commutator brush 2 by the wire 5 and thence through one or the other of the two sets of contacts, and one or the other of the two field magnet circuits $f^1$ $f^2$, to the commutator of the motor. Thence it passes through the centrifugal circuit breaker T (which serves to limit the speed of the motor by the breaking of its circuit when a definite speed is reached) and thence by the wire 10 to the commutator brush 1 of the dynamo. The motor M rotates the rheostat contact arm E by means of a worm and screw gear and on the shaft of the said contact arm is a cam disk L and also a disk O carrying projections R and S. Assuming that the dynamo reaches a given speed corresponding to say 15 miles per hour of the train, its voltage will then be sufficient to energize the shunt coil of the magnet F, which will draw its core H, against the force of the retractile spring V, and close the contacts $K^1$ and $K^2$. This will set in motion the motor M and the first movement of the rheostat arm will withdraw the stop S from the connection switch D and close the main circuit of the dynamo, leading from the commutator brush 1, to deliver current both to the batteries G and to the lamps W in multiple. At the same time the cam L will force down the shorter arm of the angle lever I and increase the tension of spring V, thereby slightly increasing the voltage maintained by the magnet F. The stop R will also be withdrawn from the spring contact P and close the circuit of the motor field magnet coil $f^1$ leading to the contact $K^4$. Thereafter the parts will continue in operative condition, and so long as the voltage is of the standard value the magnet F will maintain the motor circuit open; but upon any tendency to increase or decrease of the voltage, by reason of an increase or decrease in the train speed, the magnet will respond and close one or the other of the motor circuits to weaken or strengthen the field magnet B. When the train stops the reverse order of operation will take place and as the regulating mechanism comes to its final position, shown in the drawings, it will open that circuit of the motor which has served to bring it to that position, so that there will be no leakage of battery current through the motor, it will also open the main switch D.

In the operation just described it will be manifest that the action of the solenoid is necessarily more or less gradual, tending to produce a variable contact pressure between the contacts $K^1$ $K^2$ or $K^3$ $K^4$ which are of carbon, while the gradual separation of the contacts tends to produce an arc as I have already described which, but for the peculiar construction of the motor M, would tend to produce a stoppage of the motor before it had accomplished its duty of restoring the voltage to its normal value and allowing the contacts to separate completely. To avoid this the motor M is so constructed that it will have the maximum torque required of it at a voltage very materially lower than the normal voltage which the magnet F tends to maintain on the main line.

The current from the dynamo divides into two branches at the point 8, the current arriving at this point from the commutator brush 1 by the way of wire 10 and switch D splitting, one portion going to battery G through the series winding on the magnet and thence by the wire 12 to the opposite commutator brush 2 of the dynamo, while the remaining portion goes by the wire 14 to rheostat $C^1$ and thence by the wire 15 to the lamps W, returning to the commutator brush 2 by the wire 12. The resistance $C^1$ serves to reduce the voltage applied to the lamps to a point lower than the voltage applied to the battery and the amount of the resistance $C^1$ is regulated by means of a magnet $F^1$ energized by a shunt circuit crossing the lamp mains and controlling motor $M^1$ in substantially the same way that the magnet F controls the motor M. The motor $M^1$ is also constructed to give its maximum torque required by its load at a voltage much lower than that of the lamp circuit by which it is supplied. In this case, both of the motor circuits are ultimately broken at the two ends respectively of the range of movement of the rheostat contact arm. When the rheostat arm comes home to its "off" position, as shown in the drawing, pin c strikes the contact spring $c^1$ and opens that circuit of the motor which tends to bring the rheostat arm to its home position, while the movement of the rheostat arm in the opposite direction brings the pin b against the contact arm $b^1$ in the opposite motor circuit and breaks it when the opposite limit of the range of movement of the rheostat arm is reached. By this means the motor is never left in circuit after the travel of the rheostat arm in one direction or the other is completed.

What I claim as new and desire to secure by Letters Patent is:

1. The combination with a dynamo of a regulating device therefor, a motor operating said device, contacts in the motor circuit and an operating magnet for said contacts set to act at a voltage greater than that required by the motor when exerting the maximum torque imposed by the said devices which it operates.

2. The combination with a variable-speed dynamo, of a storage battery, a constant-potential lamp circuit, a regulating device for the dynamo, a motor on the said circuit operating said device at a voltage lower than that of the said circuit, controlling contacts in the motor circuit, and a magnet operating the said contacts.

3. The combination with a variable speed dynamo, of a constant-potential circuit, a regulating device for the dynamo, a motor on said circuit having contacts in series therewith and operating the said regulating device at a voltage lower than that of the said circuit by an amount compensating for the contact resistance, and a controlling magnet operating the said contacts.

4. In a potential-regulator the combination with a magnet responding to the potential to be regulated, of contacts operated by said magnet upon a departure of the voltage from its predetermined value, regulating devices, and an operating motor therefor in series with said contacts and adapted to give the maximum torque required by the said devices at a voltage lower than the said predetermined voltage.

5. In a potential regulator, the combination of a regulating device, a constant-potential circuit, a motor on said circuit having contacts in series therewith and operating said regulating device at a voltage lower than that of the said circuit by an amount compensating for contact resistance, and a magnet on the said circuit responding to the potential thereof and operating the said contacts.

In testimony whereof I have hereunto set my hand in the presence of two subscribing witnesses, the 7th day of July 1905.

JAMES F. McELROY.

Witnesses:
BEULAH CARLE,
ERNEST D. JANSEN.